(12) United States Patent
Hagen

(10) Patent No.: US 6,272,811 B1
(45) Date of Patent: Aug. 14, 2001

(54) SPACER FRAME FOR SEALED GLASS UNITS

(76) Inventor: Helge Hagen, Bernt Ankers vei 1, N-2010 Strömmen (NO)

( * ) Notice: Subject to any disclaimer, the term of this patent is extended or adjusted under 35 U.S.C. 154(b) by 0 days.

(21) Appl. No.: 09/254,350
(22) PCT Filed: Sep. 8, 1997
(86) PCT No.: PCT/NO97/00239
 § 371 Date: Mar. 5, 1999
 § 102(e) Date: Mar. 5, 1999
(87) PCT Pub. No.: WO98/10164
 PCT Pub. Date: Mar. 12, 1998

(30) Foreign Application Priority Data

Sep. 9, 1996 (NO) .......................................... 963765
Jan. 23, 1997 (NO) .......................................... 970295

(51) Int. Cl.⁷ .......................................................... E04L 2/54
(52) U.S. Cl. .................... 52/786.13; 52/656.1; 403/403; 403/382; 403/401; 403/402
(58) Field of Search .............................. 52/786.13, 656.1, 52/786.1, 656.9, 657; 403/403, 382, 401, 402, 363, 282

(56) References Cited

U.S. PATENT DOCUMENTS 4,683,634 * 8/1987 Cole ....................................... 29/412

* cited by examiner

Primary Examiner—Carl D. Friedman
Assistant Examiner—Patrick J. Chavez
(74) Attorney, Agent, or Firm—Nath & Associates PLLC; Gary M. Nath; Marvin C. Berkowitz (57) ABSTRACT

A spacer frame is disclosed having a polygonal, preferably mainly square frame where the frame surrounds glass panes of a sealed glass window unit by forming an upper and a lower horizontal part, at least two side parts, all of which form at least one linear listing or frame. The frame additionally has corresponding asymmetric corner keys and symmetric corner keys, each having legs. The upper horizontal part of the spacer frame preferably has a design which facilitates installation of a mechanism for a blind or pleated sheet which can be fixed underneath the spacer frame thereby hanging between respective panes of the sealed glass unit. The asymmetric corner-keys are connected with one leg to spacer elements and the other leg to the upper horizontal spacer listing elements which has two profile elements. In connection with the spacer element permanent magnets are located in two identical sets positioned on each side of an inner glass pane of the sealed unit. One set of magnets is positioned between the glasses in a holding unit, and one set of corresponding magnets with converse polarity is placed outside the holding unit. Associated with such magnets there is provided a gear assembly for moving and controlling the blind or pleated sheet in a sealed manner between the glass panes of the window.

15 Claims, 10 Drawing Sheets

SPACER FRAME FOR SEALED GLASS UNITS

FIELD OF THE INVENTION

The present invention concerns a special assembly for a spacer frame for sealed glass units such as windows, isolation glass windows, thermoglass windows etc.

SUMMARY OF THE INVENTION

The spacer frame according to the invention comprises a number of constituent parts making a polygonal, preferably mainly square frame where the frame surrounds the glass panes of the window by forming an upper and a lower horizontal part, at least two side parts, all of which comprise at least one linear listing or frame, as well as a corresponding corner keys. The upper horizontal part of the spacer-frame has a design which facilitates an installation of a mechanism for a blind. The blind is fixed underneath the spacer-frame, and will thereby be hanging in-between the glasses of the sealed glass unit.

The invention will be more closely disclosed infra with reference to the figures wherein:

DETAILED DESCRIPTION

Figure 1:
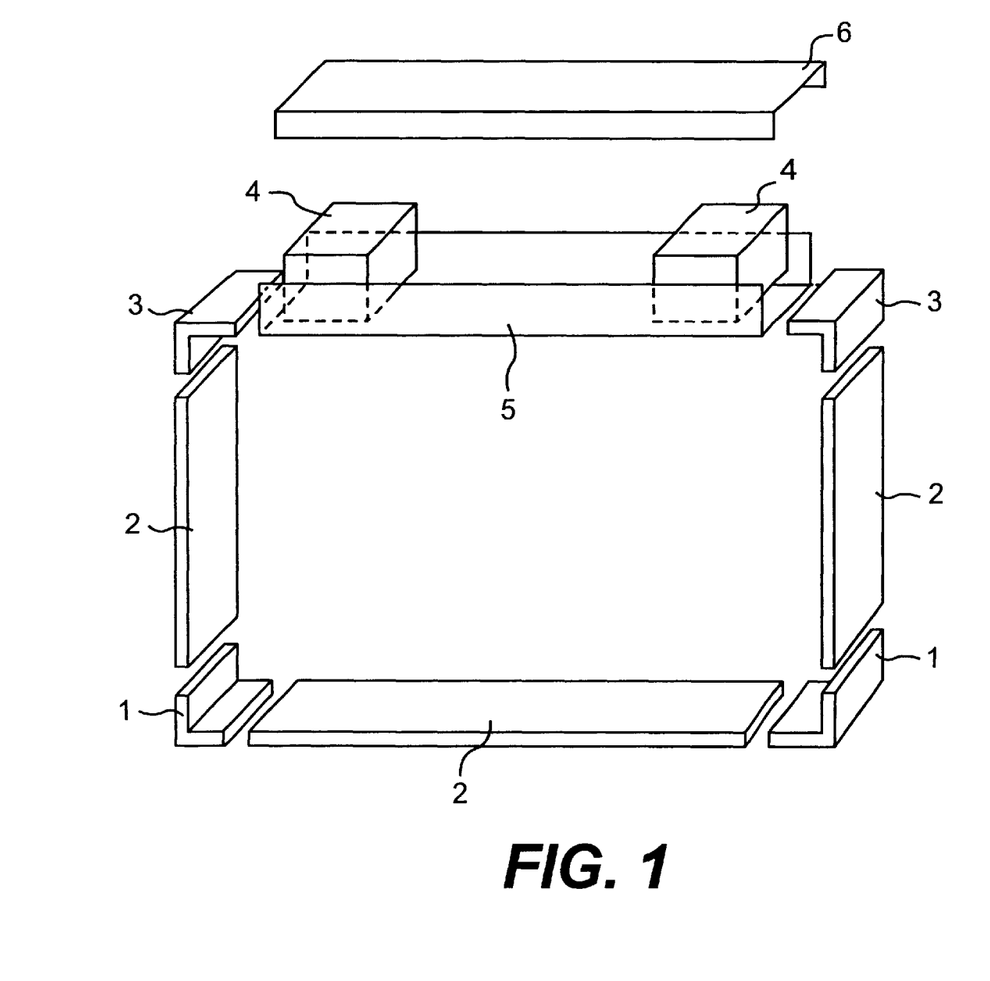
FIG. 1 shows an assembly of a spacer frame.

The components of the spacer frame have the following reference numbers: Reference number 1 relates to corner-keys of the frame forming an angle with two legs wherein both the legs are symmetric. Reference number 2 relates to listing-formed spacer elements connected at least one end thereof to the corner-keys 1. Reference number 3 relates to asymmetric corner-keys connected with one leg to the spacer elements 2. The other leg of the asymmetric corner-keys 3 are connected to upper horizontal spacer listing elements comprising two profiles with the reference numbers 5 and 6. The spacer elements 2 are used in the two vertical and the lower horizontal side of a rectangular spacer-frame. One of the upper horizontal profiles 5 has a U-shaped profile, and this spacer element is used as a base for a mechanism for a blind.

The assembly according to the present invention requires the use of two different types of corner keys to make a rectangular spacer-frame, i.e. the symmetric corner-keys 1 and the asymmetric corner-keys 3. The asymmetric corner-key 3 is one of the main elements of the present invention, and such asymmetric elements makes it possible to assemble a corner where the U-shaped spacer element 5 and the closed spacer element 2 are joined without having the inner part of the spacer element 5 being filled of the corner key.

Figure 2:
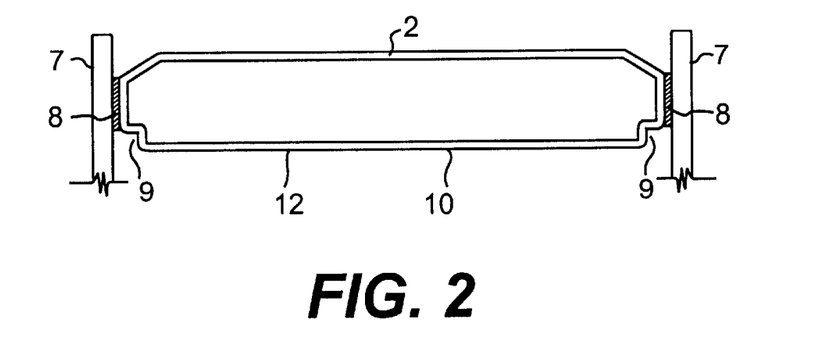
FIG. 2 is a sectional view of the sealed glass unit according to the invention.

Referring to FIG. 2, the reference numbers have the following meanings:

The reference number 2 relates to a closed spacer unit. The reference number 8 relates to a sealing material, e.g. a non-vulcanizing rubber "butyl" which is located between glass pane 7 and the closed spacer element 2. The sealing material 8 is to provide a substantially tight sealing for air and moisture between the glass 7 and the closed spacer element 2. The sealing material 8 is accordingly of a non-vulcanizing type which remains sticky over an indefinite period of time.

The closed spacer element 2 is especially designed with two inwardly extending corners 9. The inwardly pointing corners 9 will form a space for a reservoir for excess sealing material 8 which might be squeezed out from between the spacer element 2 and the glass 7 when the glass panes 7 are pressed against the spacer element 2. The excess sealing material 8 will be kept in the location provided by the corners 9 and the glass 7. The sealing material 8 will thus not penetrate into the rectangle formed by the two glass panes 7 and the inner side of the spacer 2.

It is important that the area between the two glass panes 7 and the spacer element 2 is kept free for sealing material since the slats of a free-hanging blind inside the sealed unit according to the invention will stick to any sealing material which is present and overflowing outside of the above described area 9 when the window with the glass unit is operated and the blind is put in motion. This is a typical problem for some prior types of sealed units with a built-in blind.

Providing the spacer frame for a sealed glass unit with corner elements as disclosed supra is previously not known. The objective of the corner element is to prevent sealing material from appearing inside the light-opening of the sealed unit and thereby causing contact between the slats of the blind lying between the window panes of the sealed unit.

Figure 3:
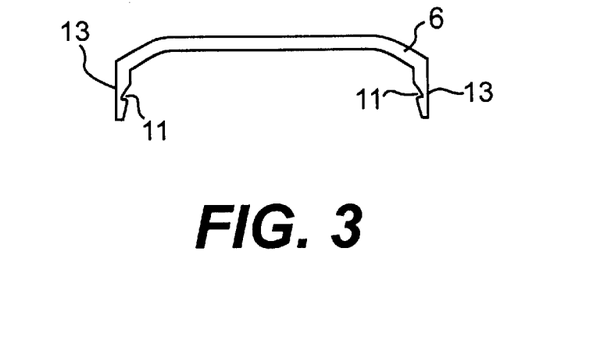
FIG. 3 is a sectional view of the open spacer part 6 from FIG. 1.
Figure 10:
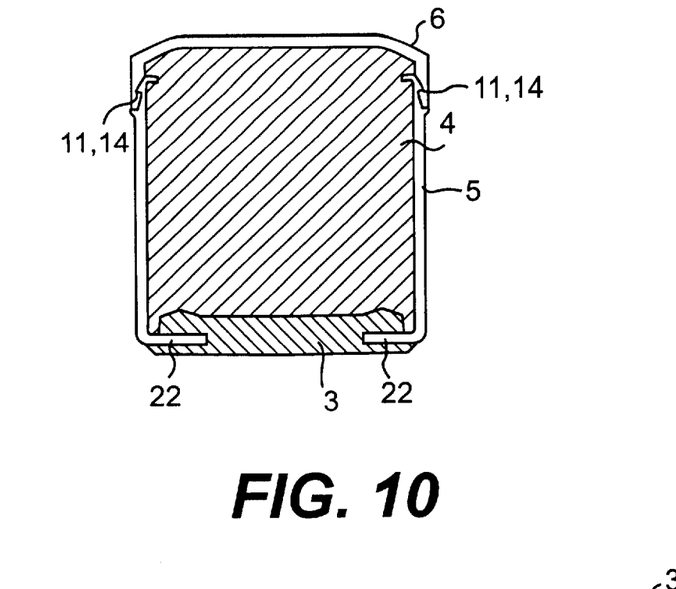
FIG. 10 is a cross section of the profile elements of FIG. 1 in cooperative engagement.

Referring now to FIG. 3, spacer element 6 comprises two legs 13 with a snapping action and comprising protruding and/or recessed elements, e.g. one or more grooves 11 on its inside. Such grooves cooperates and corresponds to similar recessed and/or protruding elements 14 located on the outside of the U-shaped profile 5 shown in FIG. 1 and in cross-section in FIG. 4. The two profile elements 6 and 5 may be assembled by snapping the grooves 11,14 together and thereby forming a closed profile. The profile assembly is shown in cross section in FIG. 10.

A novel trait according to the present invention is providing an opportunity to make a closed spacer assembly formed by two open profiles 5 and 6, for a sealed glass unit.

Furthermore, it is a goal for the present to obtain a profile for a sealed glass unit comprising two parts 5,6 which have been snapped together and which form a closed spacer unit which is suitable and which has sufficient room for installing a mechanism for a blind.

Figure 4:
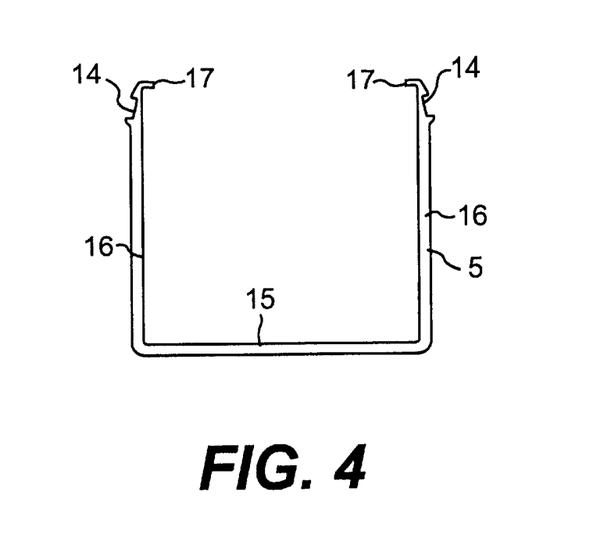
FIG. 4 is a cross section of the U-shaped profile element of FIG. 1.

Referring to FIG. 4, U-profile 5 comprises a spacer bed 15 and two spacer legs 16. At the upper end of the spacer legs 16 there is provided an inward oriented groove 17. This groove 17 secures components fixed inside the spacer 15 and secures them in the correct position in the spacer preventing them from falling out of the spacer. On the outer side of the legs 16 is the snapping groove 14 for snapping the two profiles 5 and 6 together as disclosed supra.

Figure 6:
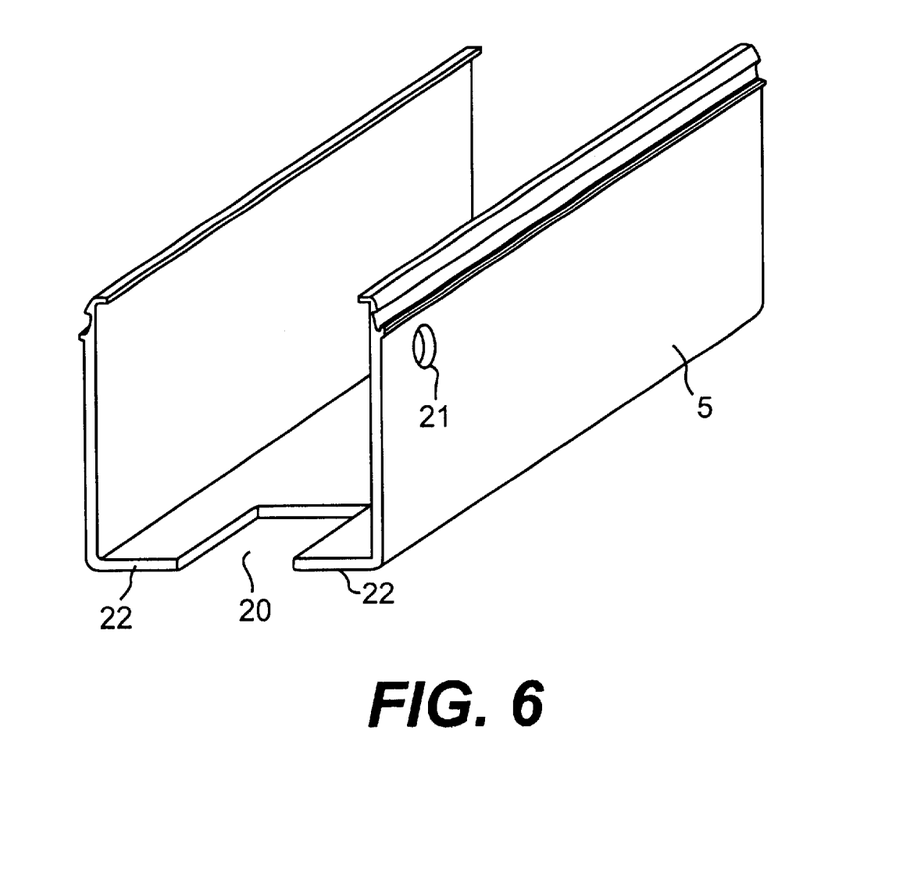
FIG. 6 is a perspective view of the lower element of the upper horizontal part shown in FIG. 1 and depicting a slot and a hole in the lower element.

When a U-shaped spacer element 5 is cut into the correct length to fit inside a sealed unit, there is, as shown in FIG. 6, punched out a rectangular slot 20 in each end of the element. This rectangular slot is required for assembling the U-formed spacer element 5 and the corner key 3.

Figure 5:
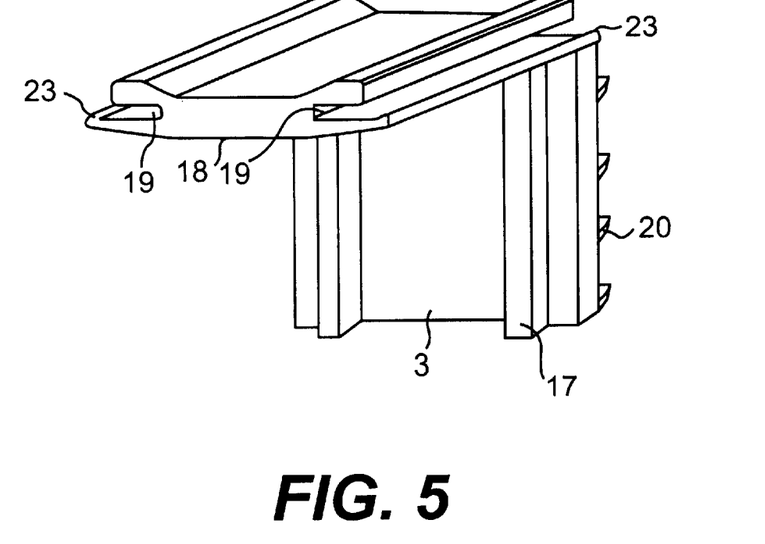
FIG. 5 is a perspective view of an asymmetric corner key.

Referring to FIG. 5, one leg 17 of the key is to be located inside the closed spacer element 2. The shape of the corner key 3 is especially designed, as is shown in FIG. 12, to fit into the closed spacer element 2. The other leg 18 of the corner key 3 is provided with a number of lengthwise running grooves 19. When the leg 18 is installed into the U-shaped spacer element 5, the leg 18 is pressed into the leg 15 of the U-shaped profile 5 in such a way that the grooves 19 on the leg 18 is embracing a section of the spacer-bed 15 which is to be found on each side of the punched-out area 20. This part of the spacer-bed is given the reference number 22. Two fins 23 on the edge of the groove 19 will provide a resistance between the leg 18 and the spacer bed 15 which prevents the corner key 3 from dropping out from the spacer element 5.

The corner key 3 is assembled with the upper horizontal spacer comprising the two profiles 5, 6 pressing the corner key 3 onto the end of the profile 5 in such a way that the edges 22 on the profile 5 fits into the groove 19 in the corner key 3.

One of the inventive features of the present invention is such an assembly of a corner key and a spacer unit, where the inner part of the spacer unit is not fitted by the leg of the corner key.

As shown in FIG. 6, a hole 21 is preferably drilled at each end of the spacer element 5. This hole 21 is to be used to fix an end plug 4 into position, as shown in FIG. 1. This also represents a novel aspect of the present invention, i.e. assembling a spacer and a corner key, where the corner key is fixed to one side of the spacer and is not filling the open space inside the spacer element.

The plugs 4 are shown in FIGS. 7, 8, 9, 14 and 15. The plug 4 comprises four wings 24. The two lower wings 24 have a designed part 25 made to fit between the sides 16 of the U-profile 5 and the bed 15 in the U-shaped spacer element 5. The two upper wings 24 have a shape to fit in underneath the upper part of the U-formed profile element 5, and they are kept in position by the grooves 17 on the U-shaped spacer element 5. On one side of the plug 3 there is a circular plug 27 which fits into the hole 21 on the U-shaped spacer element 5.

Figure 7:
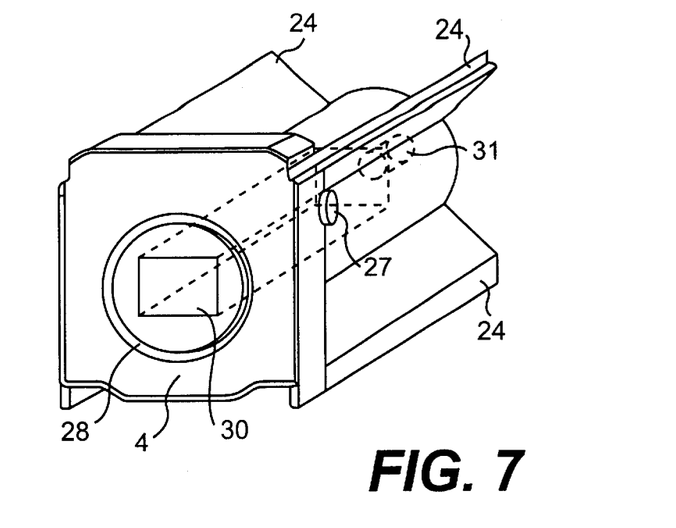
FIG. 7 is a perspective view of an end plug.
Figure 8:
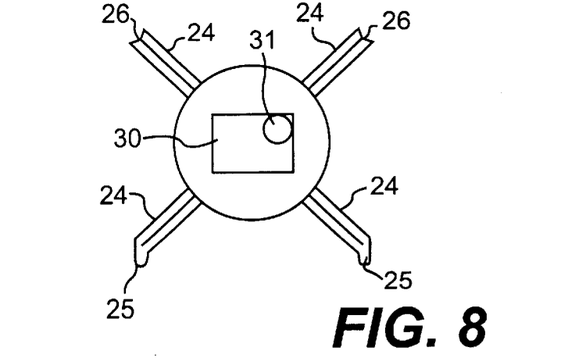
FIG. 8 is a right end elevational view of the end plug of FIG. 7.
Figure 9:
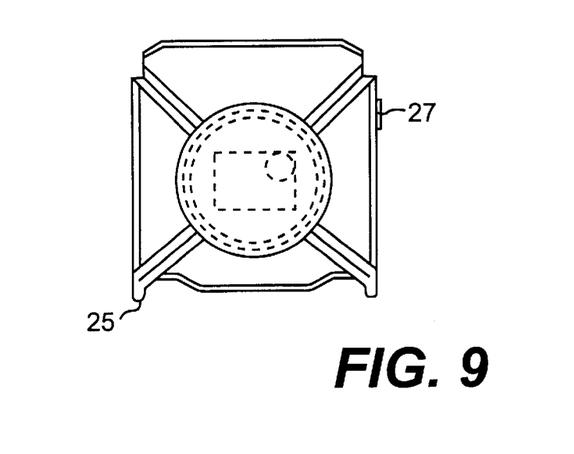
FIG. 9 is a left end elevational view of the end plug of FIG. 7.

The plug 27 prevents the plug 4 from moving when fitted inside the U-shaped profile element 5. On the outer end of the plug 4 is a groove 30. This groove 30 is provided with the male part of an electric connector. This system facilitates an easy connection of electric power to a motor built inside the sealed unit. This constellation between an electric connector and a plug in the spacer is novel and represents a part of the present invention, The construction of the sealed glass unit disclosed supra makes the production of such units easier since no loose electric cables hanging around when the sealed glass unit is to be manufactured.

The plug 4 is preferably to be manufactured in a synthetic material. Synthetic materials have a good adhesion to sealant materials normally used in sealed glass units.

Direct connection between the synthetic material, the plug and the sealant should therefore be avoided.

Figure 11:
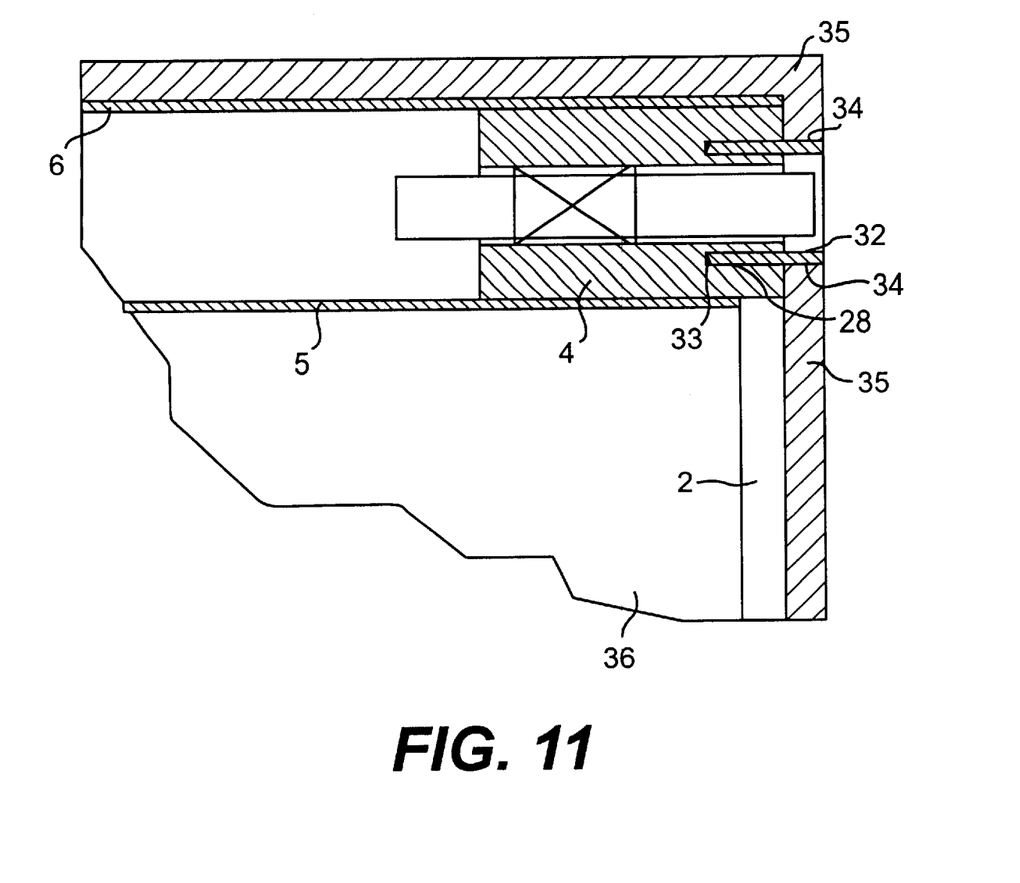
FIG. 11 is a sectional view of a corner of a sealed glass unit.
Figure 12A:
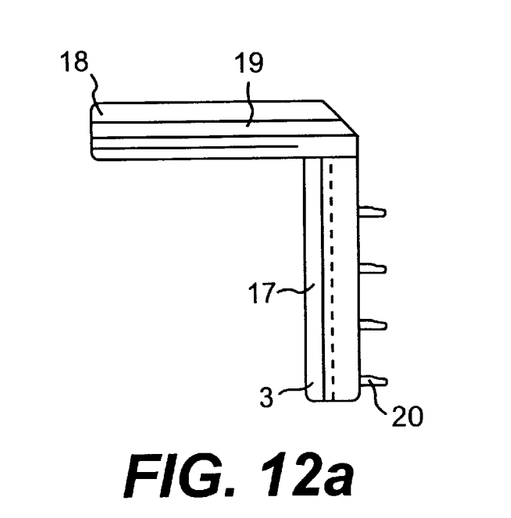
FIGS. 12a–12d are, respectively, a front elevational view, a right side elevational view, a top plan view and a bottom plan view of an asymmetrical corner key.
Figure 12B:
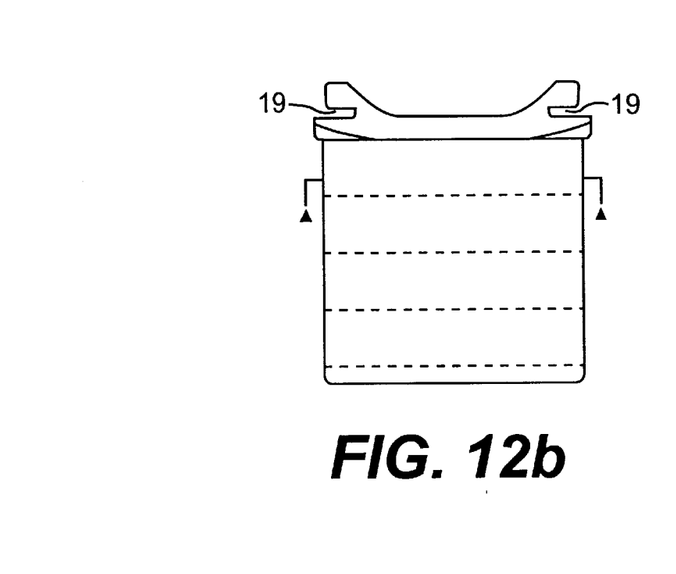
Figure 12C:
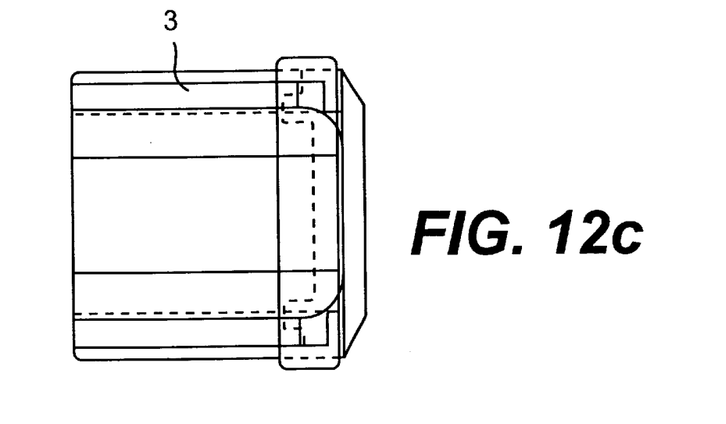
Figure 12D:
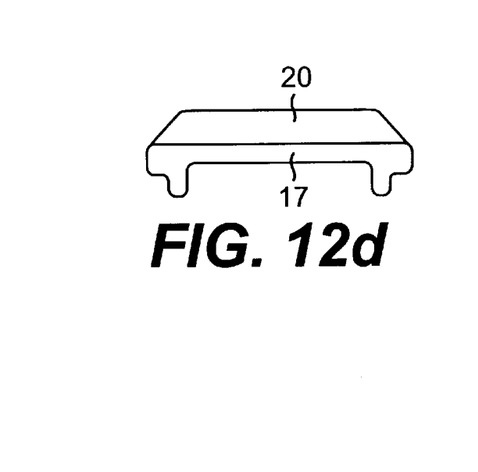
Figure 13:
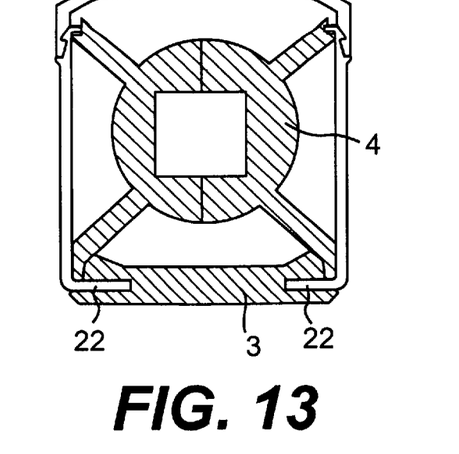
FIG. 13 is a cross-section of the plug of FIG. 7 in an installed position in the profile elements of FIG. 1 assembled in cooperative engagement.
Figure 14:
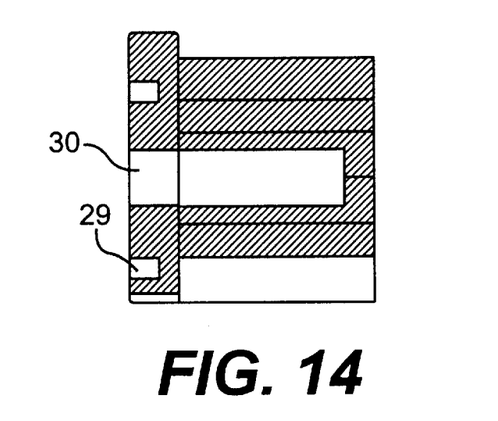
FIGS. 14–15 are a sectional view and a side elevational view, respectively, of the end plug of FIG. 1.
Figure 15:
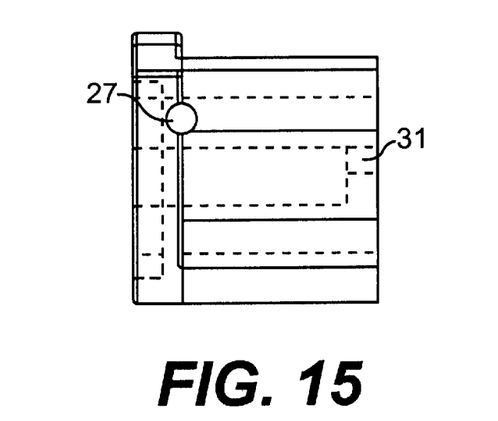
Figure 16A:
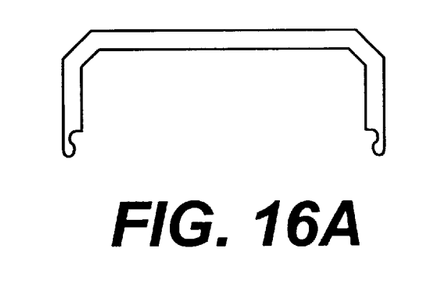
FIGS. 16a–16c are, respectively, an end elevational view of an upper element, an end elevational view of the upper and lower elements of FIG. 1 assembled in cooperative engagement, and an end elevational exploded view of an alternative embodiment of the upper element with the lower element.
Figure 16B:
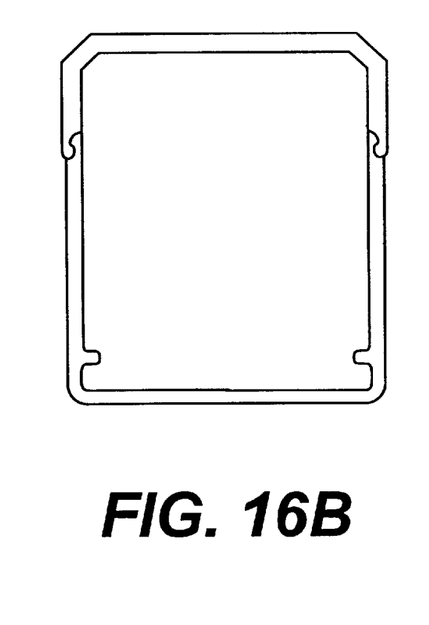
Figure 16C:
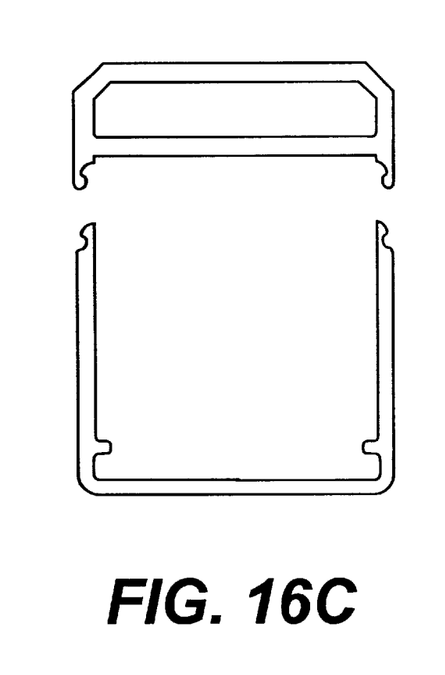

Referring to FIG. 11, a sectional view of a corner of a sealed unit assembly depicting a corner of the sealed unit where the reference number 36 is used for the glass pane, the reference number 35 is used for the sealant which glues the glass to the spacer element, the reference numbers 5 and 6 show the U-profile elements when they are in a snapped-together configuration, the reference number 2 shows the closed spacer element, and 4 is the reference number for the plug. The reference number 32 depicts a short aluminum tube with external threads, and which is screwed into the synthetic material in the groove 28. The reference number 33 shows a sealing material between the plug 4 and the aluminum pipe 32.

As the tube 32 reaches outside the end of the plug 4, the sealant will work between the glass and the tube 32, and not between the glass and the synthetic plug 4. The adhesion exists accordingly between the aluminum tube 32 and the glass being materials which both have excellent adhesion properties to the sealant.

Figure 17:
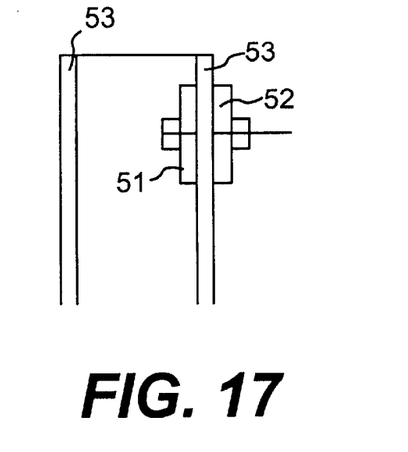
FIG. 17 is a top plan view of holding units for a cooperating pair of permanent magnets assembled on opposite sides of a glass pane.
Figure 18:
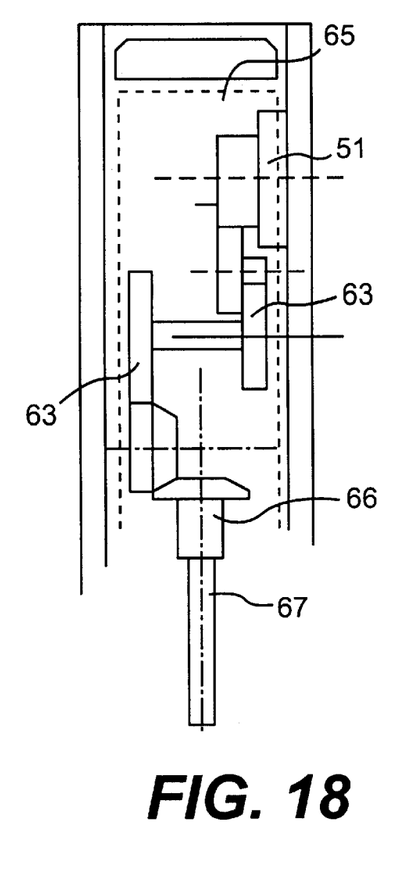
FIG. 18 is a top plan view of the inner holding unit of FIG. 17 coupled to a control mechanism for a blind.

Referring to the FIGS. 17–21, a preferred and optional operation of the blind may also be done by using permanent magnets in two identical sets positioned on each side of the inner glass pane 53 of the sealed unit. One set of magnets is positioned in-between the glasses in a holding unit 51, and one set of corresponding magnets with converse polarity is placed on the outside of a holding unit 52, as shown in FIG. 17. Two sets of magnets 51,52 are positioned exactly opposite each other on each side of the glass, and it will be disclosed infra how the operation force can be transferred through the glass.

Figure 19:
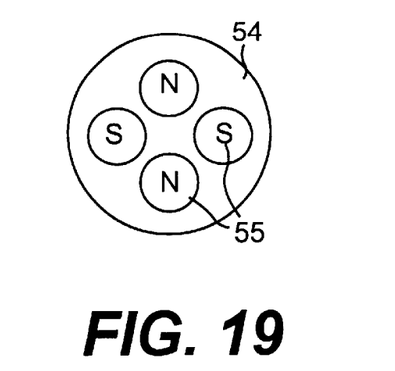
FIG. 19 is elevational view of a disk carrying pairs of permanent magnets having opposite polarities.

The "set" of magnets is designed as a disk 54 as shown in FIG. 19. Circular magnets 55 are located along the edge of the disk 54. The number of magnets 55 is preferably an even number, i.e. 2, 4, 6, 8 etc. The north poles and the south poles on the magnets are preferably alternatively facing upwards and downwards as shown in FIG. 19 and 20.

Figure 20:
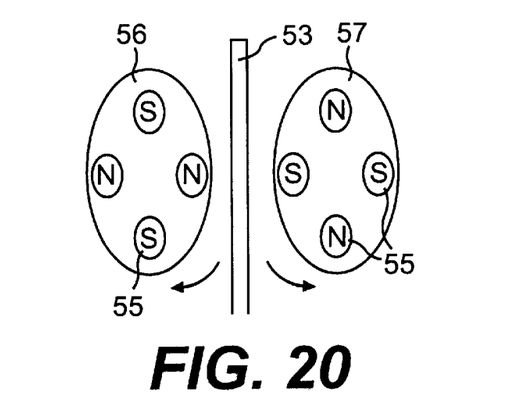
FIG. 20 is an elevational view of a cooperating pair of disks of FIG. 19 on opposite sides of a glass pane.
Figure 21:
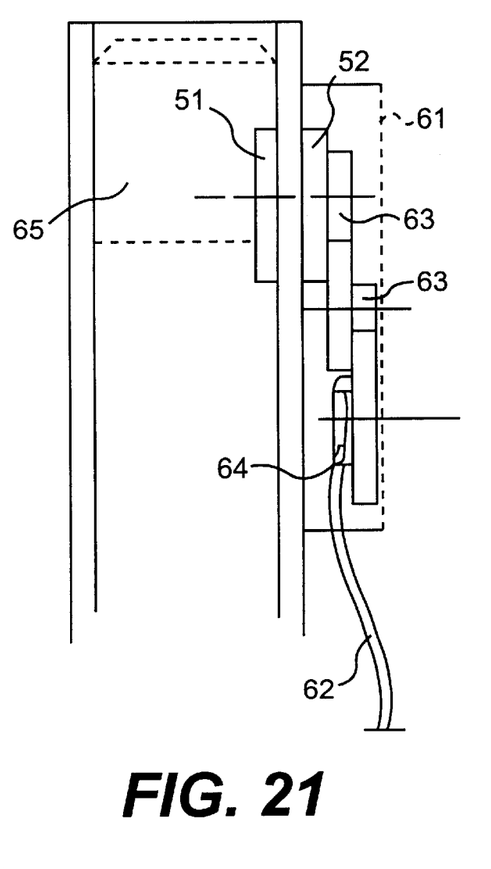
FIG. 21 is a top plan view of the outer holding unit of FIG. 17 coupled to an electric motor.

FIG. 20 shows the inner glass pane of the sealed unit 53, the inner holding disc 56 with magnets 55, and the outer holding disc 57 with corresponding magnets 55. For better understanding the two discs 56, 57 have been "pulled away" from the glass. When the two discs 56, 57 are in position on the glass, the north pole of a magnet on the external side of the glass 57 will face the south pole on a magnet on the internal side of the glass 56.

If the external disc 57 is put into rotation, the magnetic force between the magnets 55 on the two discs 56, 57 will force the internal disc 56 to rotate. The positioning of the magnets 55 will at the same time give a "pulling" force from the opposite magnet on the other disc, and a "pushing" force on the neighbouring/adjacent magnet on the other disc.

In order to maximise the transferred operating force for the blind, the discs 56, 57 shall preferably rotate with the highest possible speed. The assembly comprises accordingly two gearboxes, i.e. an internal and an external gearbox. The external gearbox 61 (see FIG. 21) connects the magnetic disc 52 and a cord wheel 64 on which the operating cord (for the blind) 62 runs via a set of toothed wheels or sprockets 63 in such a way that the transfer ratio of the gearbox is approximately 4:1. The internal gearbox is fitted inside the special spacer element which contains the lifting/lowering mechanism for the blind.

The internal gearbox 65 (see FIG. 18 and 21) connects the magnetic disc 51 to an operating shaft 67 of the lifting mechanism of the blind via a set of toothed wheels/sprockets 66 in such a way that the speed ratio of the internal gearbox will be approximately 1:8 of the speed of the rotating disc. The sprocket 66 is directly connected to the operating shaft 67 for the lifting mechanism of the blind.

The external gearbox is glued to the surface of the glass. The difference is ratios on the two gearboxes gives a total exchange ratio for the system which improves the lifting force of the magnetic system, and ensures an easy operation of the blind.

There exist several advantages in using a magnetic system when operating an integrated venetian or pleated blind.

There will be no penetration of the sealant on the edge of the sealed unit. This ensures a long lifetime of the sealed unit, since any and every penetration of the sealant is a risk for a puncture.

The operating mechanism is fitted on the surface of the glass. Accordingly it is not necessary to make any adjustment or mechanical alterations on the window frame/sash when fitting a unit with an integrated blind.

The construction of the spacer frame according to the invention is disclosed supra with reference to a special embodiment depicted in the figures accompanying the application. However, the scope of the invention is not to be construed as being founded in the above mentioned embodiment, but rather through the following claims.

What is claimed is:

1. A spacer frame for an isolation glass for windows that includes glass panes that surround the spacer frame, the space frame comprising:
   an upper and a lower horizontal part, said upper and lower horizontal parts forming distancing elements in the spacer frame;
   at least two side parts;
   a plurality of upper asymmetrical corner keys each having a first leg connected to one of said at least two side parts and a second leg connected to said upper horizontal part; and
   lower corner keys connected between said side parts and said lower building part;
   wherein said upper horizontal part further comprises two separate elements, an upper element and a lower element which are removably connected to each other;
   wherein when each of said upper asymmetrical corner keys are secured to said upper horizontal part, said asymmetrical corner key does not fill an open space defined between said upper and lower elements of said upper horizontal part.

2. The spacer frame according to claim 1, wherein one of said upper and lower elements of said upper horizontal part has a U-formed profile.

3. The spacer frame according to claim 1, wherein each of the plurality of asymmetrical corner keys and the upper horizontal part form a securing point for the regulating mechanism for the blind.

4. The spacer frame according to claim 1, further comprising a sealant located between a glass pane and at least one of said at least two side parts and said lower horizontal part.

5. The spacer frame according to claim 1, wherein each of said closed spacer elements further comprises at least two inwards protruding edges.

6. The spacer frame according to claim 1, wherein said upper element of said upper horizontal part further comprises two legs each leg of said upper element comprising one or more grooves on an inside thereof, said grooves interlocking with and corresponding to similar grooves located on an outside of said lower element of said upper horizontal part.

7. The spacer frame according to claim 1, wherein:
   said lower element of said upper horizontal part further comprises two upwardly extending legs, each upwardly extending leg having an inwardly facing flange located on an upper end thereof, said flanges for securing, in a correct position, a plurality of components that can be placed inside said lower element whereby the components are prevented from falling out of said lower element.

8. The spacer frame according to claim 1, wherein said first leg of each said asymmetrical corner key fits inside one of said at least two side parts, and said second leg of each said asymmetrical corner key further comprises a number of elongated grooves.

9. The spacer frame according to claim 1, wherein:
   said lower element of said upper horizontal part further comprises a horizontal transverse member, said transverse member having a lateral edge at each axial end thereof, each said lateral edge comprising first and second tongues, each of said first and second tongues having a lateral edge and an axial edge, said axial edges of corresponding pairs of said first and second tongues defining a notch centrally disposed therebetween; and
   said second leg of each of said upper asymmetrical corner keys further comprises a number of elongated grooves; whereby
   each of said upper asymmetrical corner keys is connected to one axial end of said lower element by slidingly engaging said axial edge of each of said first and second tongues in corresponding ones of said number of elongated grooves.

10. The spacer frame according to claim 1, further comprising:
   a plug having two radially extending lower wings and two radially extending upper wings, each lower wing having a foot connected to a radially extending end thereof, and each upper wing having an axial aligned groove in a radially extending end thereof;
   wherein said lower element of said upper horizontal part includes upwardly extending legs, whereby said lower wings of said plug fit between the upwardly extending legs of said lower element, and said groove in each of said upper wings fits under a corresponding inwardly facing flange disposed at an upper end of a corresponding one of said upwardly extending legs, said plug being held thereby.

11. The spacer frame according to claim 1, further comprising:

a plug having an outer end comprising a groove said groove having a male part of an electrical connector disposed therein for connecting electrical power to a motor that can be disposed inside the upper horizontal part.

12. The spacer frame according to claim 1, wherein the upper horizontal part further comprises:

a securing part whereby a blind can be secured under the spacer frame; and at least two end parts comprising a part of a regulating mechanism for the blind.

13. The spacer frame according to claim 1, wherein said at least two side parts and said lower horizontal part each comprise a closed spacer element.

14. The spacer frame according to claim 1, wherein said upper and lower elements have corresponding profiles.

15. The spacer frame according to claim 1, wherein said lower corner keys are symmetrical.

* * * * *

UNITED STATES PATENT AND TRADEMARK OFFICE
CERTIFICATE OF CORRECTION

PATENT NO. : 6,272,811 B1  
DATED : August 14, 2001  
INVENTOR(S) : Helge Hagen

Page 1 of 1

It is certified that error appears in the above-identified patent and that said Letters Patent is hereby corrected as shown below:

<u>Column 6,</u>  
Line 9, please delete "1" and insert therefor -- 12 --.  
Line 17, please delete "1" and insert therefor -- 13 --.

Signed and Sealed this

Seventh Day of May, 2002

Attest:

Attesting Officer

JAMES E. ROGAN  
*Director of the United States Patent and Trademark Office*